United States Patent [19]

Lovecky et al.

[11] Patent Number: 5,600,719
[45] Date of Patent: Feb. 4, 1997

[54] PORTABLE STORAGE DEVICE FOR A TELEPHONE LINE

[75] Inventors: Craig S. Lovecky, Old Orchard Beach; Richard Rolfe, Biddeford, both of Me.; Alan B. Lowry, Canton, Mass.

[73] Assignee: Shape Inc., Biddeford, Me.

[21] Appl. No.: 601,647

[22] Filed: Feb. 14, 1996

Related U.S. Application Data

[63] Continuation of Ser. No. 266,506, Jun. 27, 1994, abandoned.

[51] Int. Cl.⁶ ................................................... H04M 1/00
[52] U.S. Cl. ........................................... 379/438; 379/437
[58] Field of Search .................................. 379/437, 438; 439/4, 528; 242/395, 395.1, 532.6, 388.5, 388.4

[56] References Cited

U.S. PATENT DOCUMENTS

| | | |
|---|---|---|
| 1,247,672 | 11/1917 | Hallberg . |
| 2,031,434 | 2/1936 | Stern et al. . |
| 2,521,226 | 9/1950 | Keller ................................ 242/395 |
| 4,138,177 | 2/1979 | van Valer ............................... 439/4 |
| 4,646,987 | 3/1987 | Peterson . |
| 4,650,073 | 3/1987 | Young . |
| 4,742,336 | 5/1988 | Hall et al. . |
| 4,756,171 | 7/1988 | Homar . |
| 4,940,859 | 7/1990 | Peterson . |
| 4,946,010 | 8/1990 | Bono . |
| 5,076,423 | 12/1991 | Russack . |
| 5,117,456 | 5/1992 | Aurness et al. . |
| 5,128,993 | 7/1992 | Skowronski . |
| 5,155,766 | 10/1992 | Skowronski . |
| 5,156,242 | 10/1992 | Ditzig . |
| 5,230,481 | 7/1993 | Wheeler et al. . |
| 5,241,593 | 8/1993 | Wagner . |

FOREIGN PATENT DOCUMENTS 462846  12/1991  European Pat. Off. .

OTHER PUBLICATIONS

U.K. Search Report Aug. 10, 1995, Appln. No. 9512931.8.

Primary Examiner—Krista M. Zele
Assistant Examiner—Jack Chiang
Attorney, Agent, or Firm—Staas & Halsey

[57] ABSTRACT

A portable telephone line storage device, including a housing, a manually rotatable reel within the housing, a telephone line having a first end with a telephone jack, and a second end with a telephone jack, wherein said line is movable between a first retracted position inside the housing, and a second extended position where a majority of the line is outside of the housing, and wherein the telephone jacks are positioned inside the housing in the first position, and outside the housing in the second position.

18 Claims, 6 Drawing Sheets

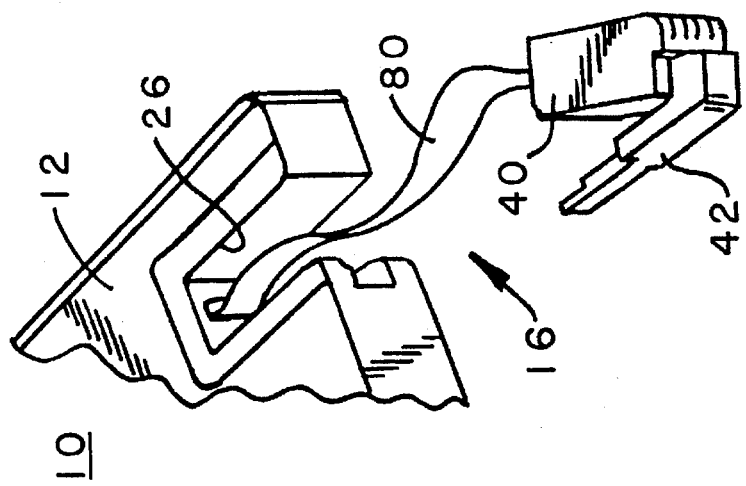
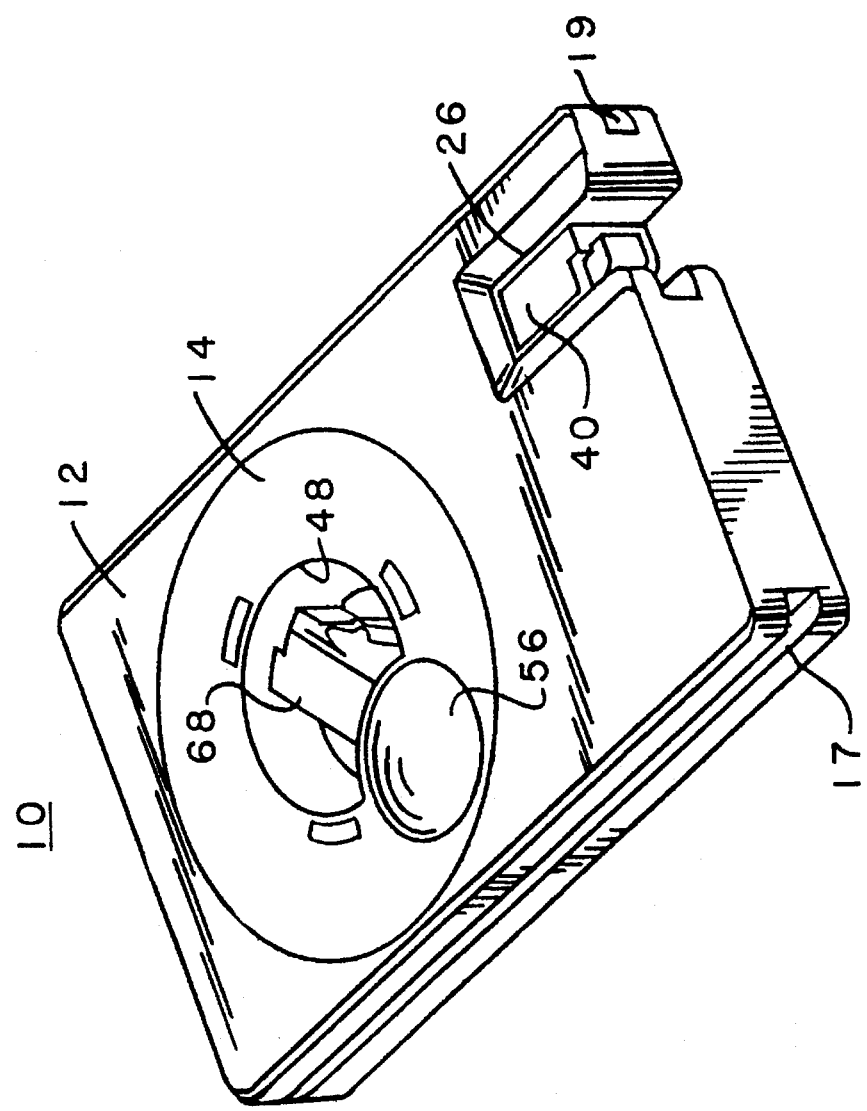

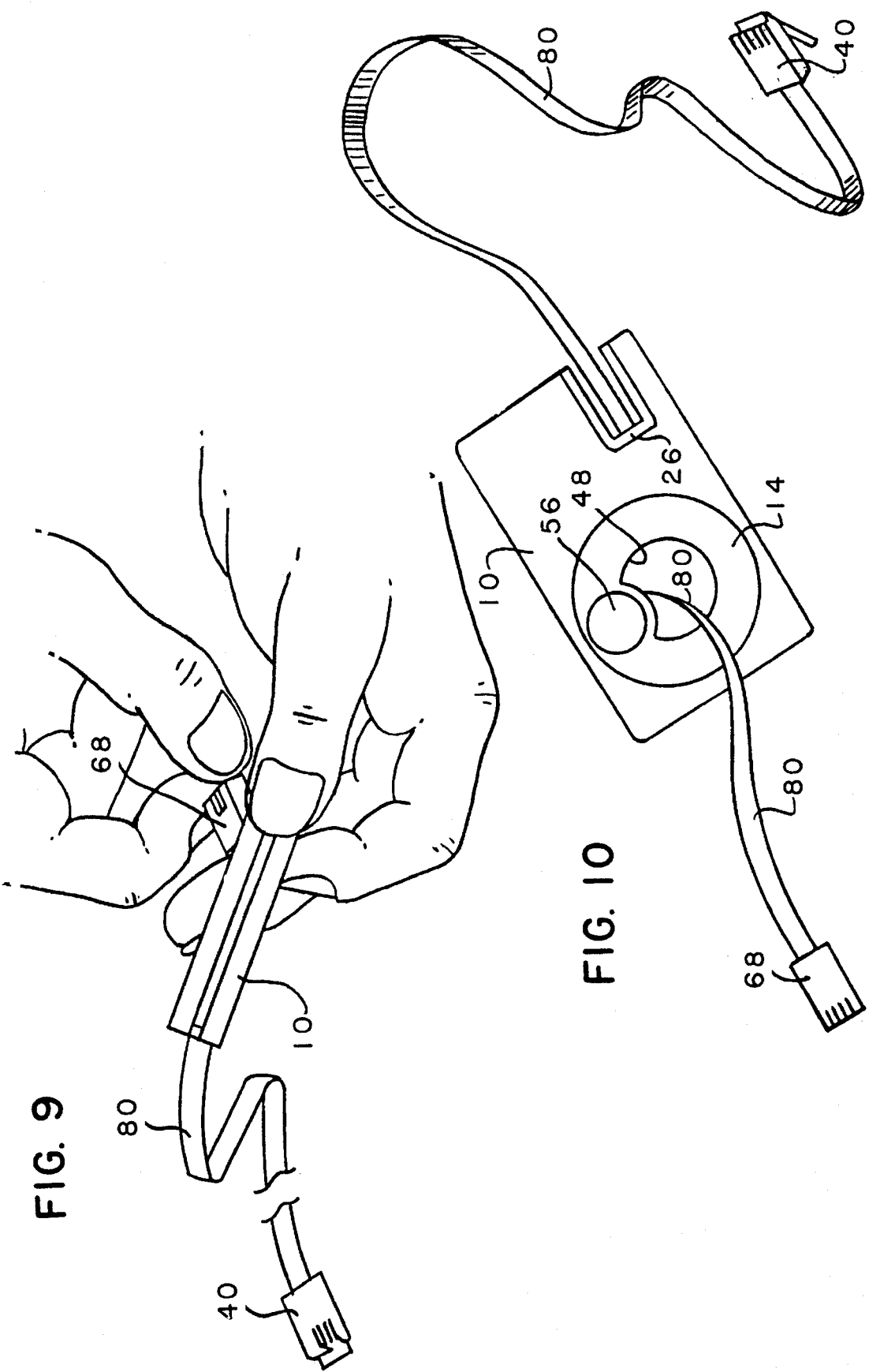

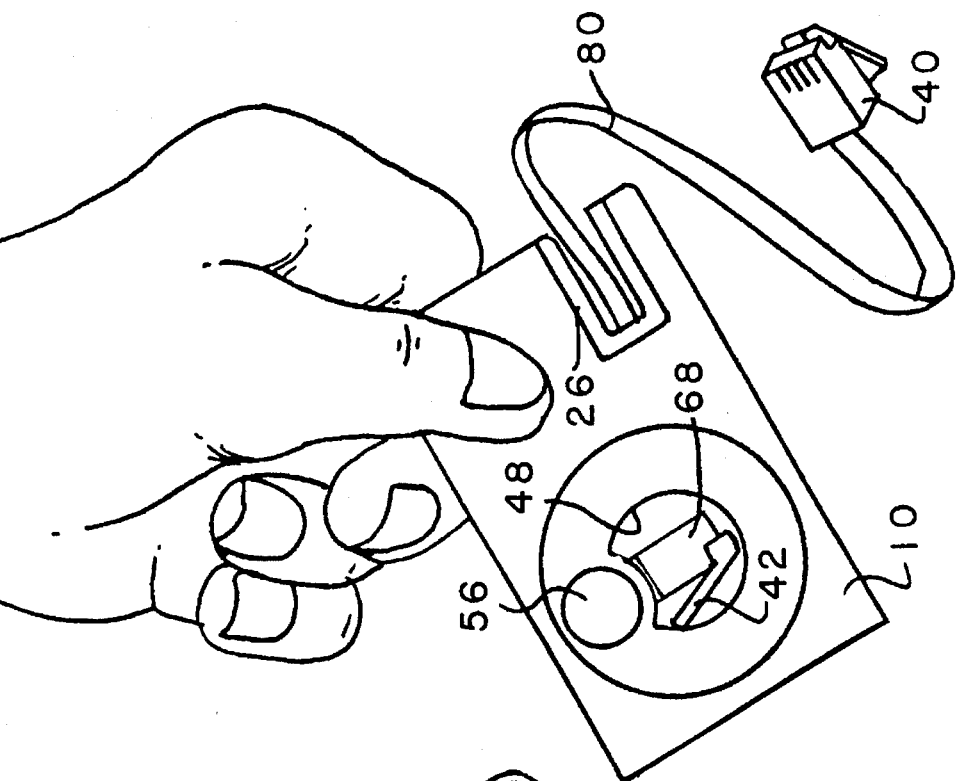
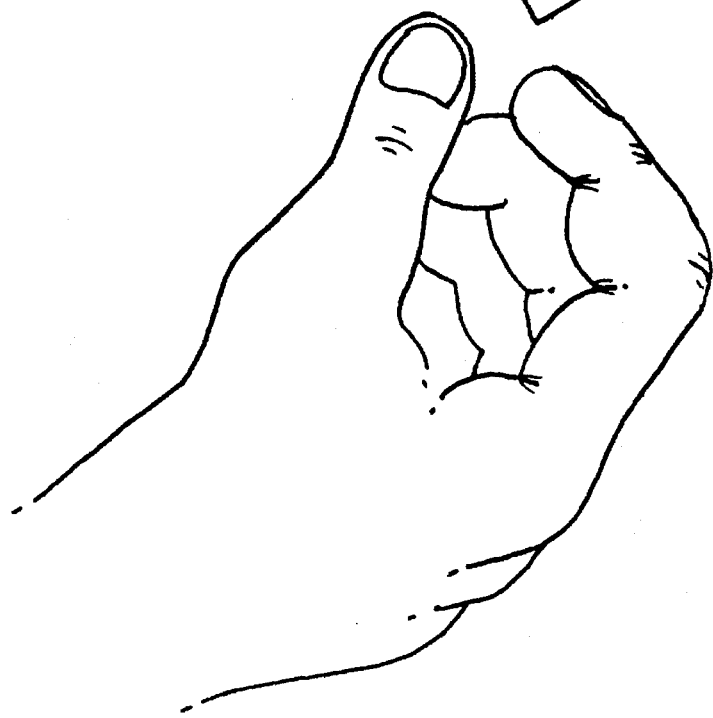
FIG. 11

PORTABLE STORAGE DEVICE FOR A TELEPHONE LINE

This application is a continuation, of application Ser. No. 08/266,506, filed Jun. 27, 1994, now abandoned.

BACKGROUND OF THE INVENTION

This invention relates to computer peripherals and, more particularly, to a storage device for a telecommunications link such as a telephone line that connects a portable computer to another telephone line.

Portable computers, such as laptops and notebooks, are becoming more and more popular. People are finding many ways to use portable computers while travelling.

For example a portable computer can be used to send data to another computer. In this regard, many portable computers include internal modems to support such telecommunications activities but require an external connection to a wall jack prior to use. In order to connect the portable computer to the wall jack, an intermediate telephone line is used. Usually, this intermediate telephone line is about six feet long and has male telephone jacks at each end. One male jack fits into a female receptacle on the portable computer and the other male jack fits into a female wall jack.

This intermediate telephone line is usually stored in a briefcase or pocket when not in use. Most particularly, the line is wound against itself in a more manageable length, and a rubber band or tie is used to prevent the line from unravelling.

The use of the intermediate line in this way is bulky, cumbersome and unorganized. When travelling and working with a computer, these characteristics are to,be avoided.

Further, this crude storage manner lends itself to dirt being introduced at the male jacks of the intermediate line, potentially interfering with the connection or transmission.

There have been known various devices to store and let out telephone line. For example, U.S. Pat. Nos. 1,247,672; 2,031,434; 4,940,859; 5,117,456; 5,156,242; and 5,241,593, each relate to a device that automatically retracts telephone line let out of the device. These devices are intended to allow the user of the telephone to move about while using the telephone. As the person moves about, the telephone line is let out or retracted as need be. These are not portable devices, however, since each is connected to the telephone base, headset or wall jack.

U.S. Pat. No. 4,646,987 relates to an automatic telephone line retraction device that is connected between the headset and the base. In this device, a multi-part, spring-biased retraction mechanism is required. Also, the jacks thereof are always exposed outside of the housing. Finally, this device, although detachable from the telephone, is not intended to be carried about and used on other phones.

In light of the above, the prior art lacks a portable device that allows a length of telephone line to be carried about in an organized, compact and efficient manner, characteristics critical to computer users during travelling. The prior art also lacks a device that allows the line to be easily coiled when not in use, and extended when desired to be used for connecting a portable computer with another telephone line. The prior art also lacks a device which can protect the jacks when not in use.

SUMMARY OF THE INVENTION

Accordingly, it is a purpose of the present invention to provide a device for storing a length of telecommunication line in an organized, compact and portable manner.

It is another purpose of the present invention to provide a very compact and lightweight single reel take-up device for a telecommunications line which is inexpensive to manufacture and allows for storage of the line without any part being slack or exposed.

It is another purpose of the present invention to provide a device that allows manual reeling and letting out of a desired amount of telephone line for use with a portable computer.

It is another purpose of the present invention to provide a telephone line take up assembly that provides storage of telephone line when not in use.

It is still another purpose of the present invention to provide a device that stores the telephone line end jacks therewithin to minimize the occurrence of dirt and other contaminants from contacting the jacks.

It is another purpose of the present invention to provide a relatively simple device that stores a retrievable telephone line without the need for complicated automatic winding mechanisms, which may include metal that could negatively affect magnetic media.

It is another purpose of the present invention to provide a device for storing and letting out a desired length of telephone line that is easy to use, inexpensive and very compact.

It is another purpose of the present invention to provide a flat device which stores a telephone line for computer use, and which can be stored neatly and coplanar with other computer peripheral devices, such as PCMCIA cards.

To achieve the foregoing and other purposes of the present invention, there is provided a portable telephone line storage device, including a housing, a manually rotatable reel within the housing, a telephone line having a first end with a telephone jack, and a second end with a telephone jack, wherein said line is movable between a first retracted position inside the housing, and a second extended position where a majority of the line is outside of the housing, and wherein the telephone jacks are positioned inside the housing in the first position, and outside the housing in the second position.

Other features and advantages of the present invention will be apparent from the following description taken infonjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a perspective view of the device in the telephone line storage configuration.

FIG. 8 is a partial perspective view of a first jack extending outside of the device.

FIG. 9 is a view showing removal of a second jack from the device.

FIG. 10 is a view showing both jacks extending outside of the device.

FIG. 11 is a view showing the winding up of the telephone line.

DESCRIPTION OF THE PREFERRED EMBODIMENTS

The preferred embodiments will now be described with reference to FIGS. 1–11.

Figure 1:
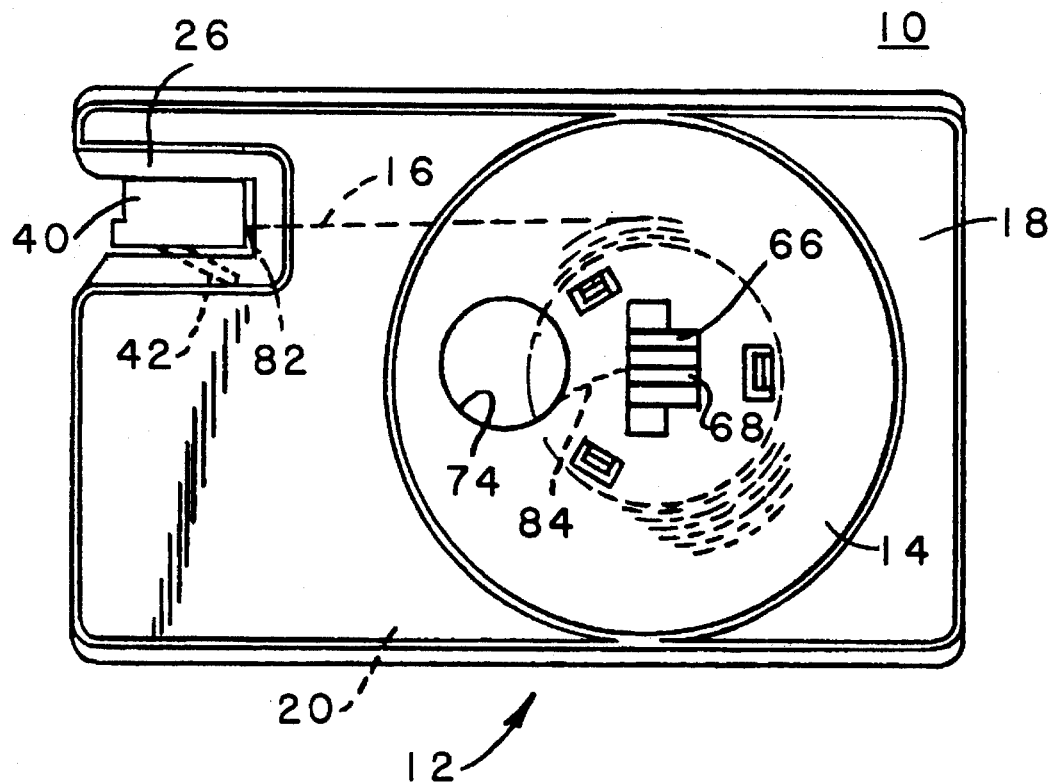
FIG. 1 is a bottom plan view Of the device according to the present invention.

In general, the storage device 10 according to a preferred embodiment of the present invention is best shown in FIGS. 1 and 7 and includes a housing 12, a rotatable reel 14 and a telephone line 16. Preferably the housing 12 and reel 14 are made of injection molded plastic.

The housing 12 is generally rectangular and has a size slightly larger than a TYPE III PCMCIA card. That is, the housing 12 is about 3 and 5/8 inches long, 2 and 1/8 inches wide and 7/16 inches thick. The housing 12 includes longitudinal recesses 17, 19 along each long side.

The housing 12 is preferably made up of two halves 18 and 20. Since the halves 18, 20 are substantially equivalent, only one half 18 is described in detail below.

Figure 2:
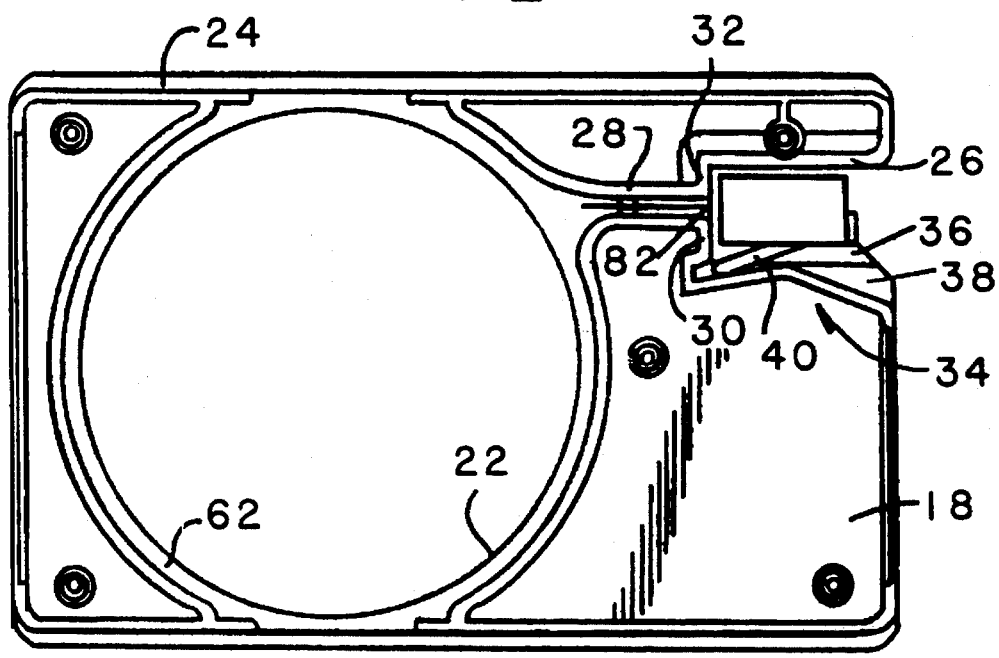
FIG. 2 is a plan view of the inside of a housing half of the device shown in FIG. 1.

As best shown in FIGS. 1 and 2, the housing half 18 is generally rectangular and includes a circular opening 22, a peripheral wall 24 a peripheral opening 26 and a channel 28 extending between the peripheral opening 26 and the circular opening 22.

The circular opening 22 is intended to receive in rotatable relation the reel 14 described in detail below. This circular opening 22 is preferably about 1 and 7/8 inches in diameter.

The peripheral wall 24 is intended to mate with a similar wall on the other housing half 20 to enclose the reel 14 therewithin in rotatable relation.

The peripheral opening 26 is intended to receive in removable relation, a first jack 40 described below. The peripheral opening 26 is generally rectangular with one side open to the outside of the device 10. The opposite side 30 is interrupted by one end 32 of the channel 28. One of the long sides 34 of the rectangular shape of the peripheral opening 26 includes an outer wall 36 and an adjacent recess 38. The outer wall 36, when combined with a similar wall on the other housing half 20, prevents sideways dislodgement of the first jack 40 in the peripheral opening 26. The recess 38, when combined with a similar recess on the other housing half 20, serves to accept with adequate clearance a deflectable clip 42 formed on conventional telephone jacks, such as those used with the preferred embodiment herein.

The peripheral opening 26 guides and receives the clip 42 formed on the conventional jack. In this way, when the reel 14 is rotated in one direction, the telephone line 64 is wound on the reel 14, and the first jack 40 is led into the opening 26, where it is held during shipment, movement, etc.

Figure 3:
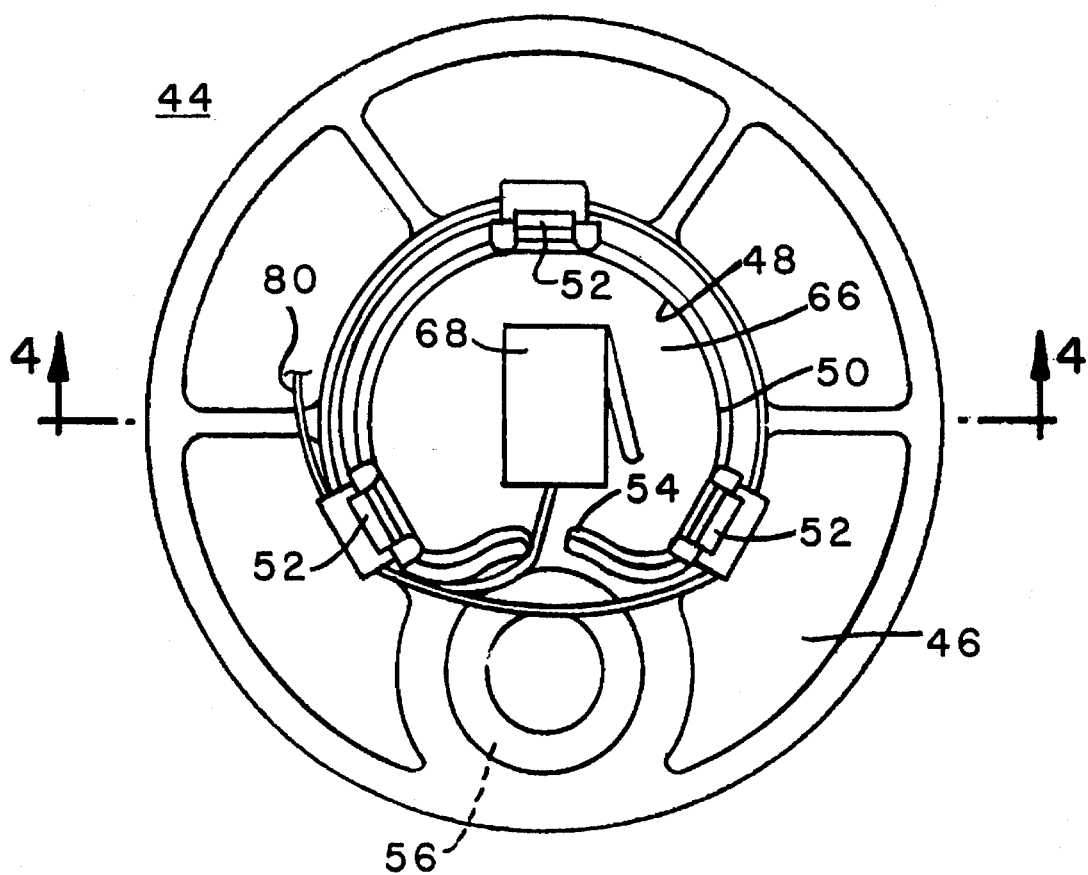
FIG. 3 is a plan view of the inside of a top half of the reel for the device according to the present invention.
Figure 4:
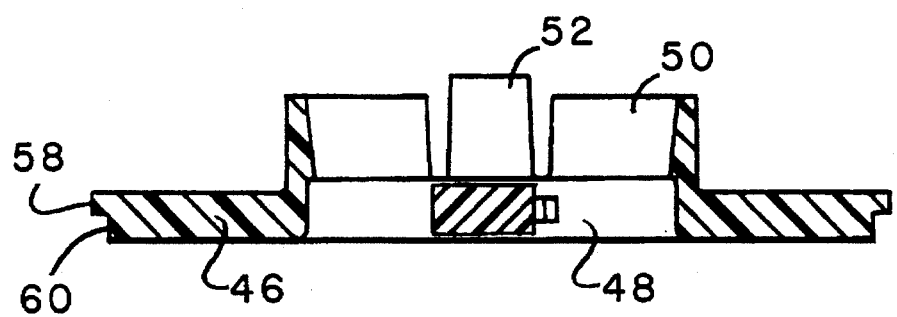
FIG. 4 is a side, cross-sectional view of the reel half shown in FIG. 3.

FIG. 3 is a plan view of one half 44 of the reel 14, which is arbitrarily denominated herein as the "top" half of the reel 14. FIG. 4 is a side view thereof. The top half 44 basically includes a planar base 46 with a central somewhat semicircular opening 48, a wall 50 surrounding the central opening 48 and including three hooked projections 52 formed therein extending upwardly from the base 46, an opening 54 formed in the wall 50 extending from the central opening 48 to the planar base 46, and a circular depression 56.

The planar base 46 includes a periphery 58 that has a step 60 which is received by an edge 62 (FIG. 2) of the opening 22 in the housing halves 18, 20. In this way, when the reel halves 18, 20 are connected with the telephone line 64 therebetween, and the reel 14 is received between the housing halves 18, 20, the reel 14 is prevented from being dislodged from the housing 12, and is rotatably mounted so that the reel 14 can be easily manually rotated to take up the telephone line 64.

The central opening 48 provides an area 66 to receive a second jack 68 when the telephone line 64 is stored in the device 10. The area 66 is large enough to allow the second jack 68 to be pushed in and out of the area 66 without interference from the reel 14, but only when the telephone line 64 is unwound.

The hooked projections 52 connect the top half 44 of the reel 14 to the bottom half 70 of the reel 14 described in detail below. The hooks on the projections 52 fit into receptacles 72 in the bottom half 70 of the reel and engage projection 73 to fix the top and bottom halves 44, 70 by an interference fit.

The opening 54 in the wall 50 allows the telephone line 64 to pass freely from the second jack 68 and into the reel 14, where it is wound on the wall 50 and attaches to the first jack 40.

The circular depression 56 is formed on the exterior of the top reel half 44 to facilitate rotation of the reel 44 when taking up the telephone line 64, as described below. The bottom half 70 of the reel 14 includes a similar circular depression 74 at a position corresponding to the circular depression 56 on the top half 44, which is cooperatively used to rotate the reel, as described below.

Figure 5:
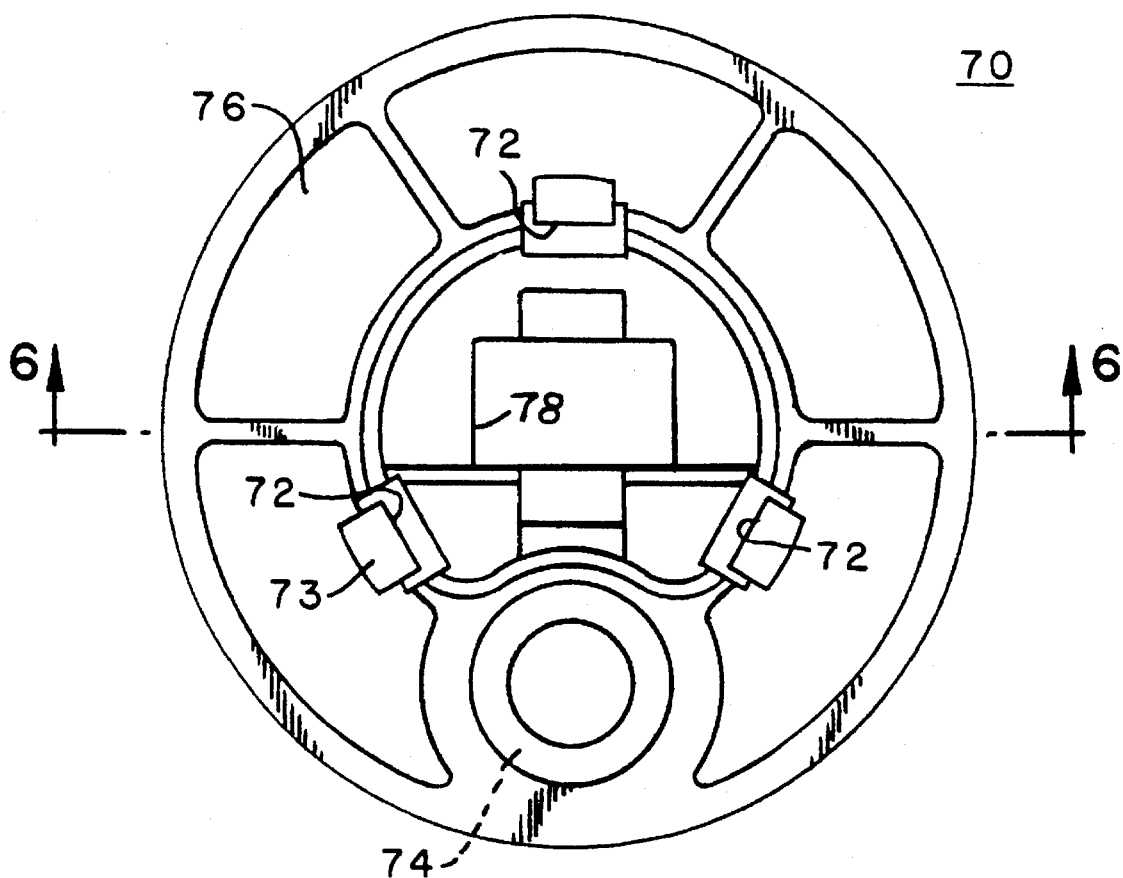
FIG. 5 is a plan view of the inside of the bottom half of the reel for the device according to the present invention.
Figure 6:
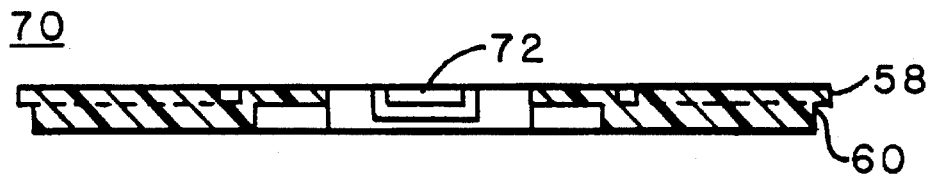
FIG. 6 is a side, cross-sectional view of the reel half shown in FIG. 5.

FIG. 5 is a plan view of the bottom half 70 of the reel 14. FIG. 6 is a side view thereof. The bottom half 70 includes a planar base 76 with a central rectangular opening 78, the three openings 72, and the circular depression 74.

The three openings 72 receive the hooked projections 52 of the top half 44 of the reel 14 after the telephone line 64 is wound in the top half of the reel 14.

The telephone line 64 is a length of flat tape 80. The preferred length is about file to six feet to facilitate connection of a computer (not shown) to a telephone wall jack (not shown). The tape 80 contains four fine wires interconnecting the jacks 40 and 68. The fine wires are covered in plastic.

In the preferred embodiment, the tape 80 is about 0.370 inch wide and 0.020 inch thick, allowing a tape 80 about five feet long to be wound on the reel 14 only about two inches in diameter. The invention, however, is not limited to these specific dimensions.

The first jack is a conventional male telephone connector terminal or jack known as an "RJ-11" fixed to the first end 82 of the telephone line 64. The jack 40 can also be, e.g., an optical fiber connector or some electrical connection cord. The jack 40, in the stored position, is removably received in the opening 26 at the periphery of the housing 12.

The second end 84 of the telephone line 64 includes the second jack 68, also an "RJ-11" jack. This jack 68 usually is received in the area 66 formed at the center of the reel 14. This area 66 includes space to accommodate the jack 68 and protruding clip 42 such that they do not extend out of the housing 12, and helps to keep the second jack 68 in this position during shipment, handling, etc., except when it is desired to use the device 10 with the computer.

This configuration helps to prevent dirt and other contaminants from getting to the terminals in the jacks 40, 68.

Also this configuration creates a compact device 10 wherein no parts extend beyond the area defined by the housing 12, except when it is desired to extend the telephone line 64 for use with the computer.

In order to make the present invention, the housing 12 and reel 14 are each preferably made in the two respective longitudinal halves 18, 20 and 44, 70. Prior to joining the two halves 44, 70 of the reel 14, the telephone line 64 is wound in the top half of the reel 14, and the bottom half 70 of the reel 14 is connected to the top half 44 via the hooked projections 52 cooperating with the receptacles 72. The reel 14 is then be placed in one half 18 of the housing 12 which is then attached to the other half 20 of the housing 12. The connection of these halves 44, 70 of the reel 14 and those 18, 20 of the housing 12 can be accomplished by using cooperating male and female posts and by gluing, ultrasonic welding, and other means known in the art.

Use of the device 10 will now be described. Assuming the device is in the stored telephone configuration as shown in Fig. 7, the first jack 40 is grasped by the thumb and index finger of a user's hand and pulled out of the housing 12. FIG. 8 illustrates the first jack 40 extending out of the device 10 due to this pulling. At the same time that this pulling is occurring, the other hand holds the housing 12.

As this pulling continues, the reel 14 rotates and lets out the telephone line 64. When the telephone line 64 has been fully let out, the second jack 68 can then be removed from the area 66. In order to do this, a finger or utensil can be pushed through the rectangular opening 78 of the reel 14 to push the second jack 68 out of the housing 12. The second jack 68 can be pulled out of the housing 12, a distance up to about the length of the telephone line 62 as shown in FIG. 9. Of course, the more the second jack 68 is pulled out of the housing 12, the more the first jack 40 is pulled back toward the housing 12. FIG. 10 illustrates the telephone line 62 extending out of both ends of the device 10.

In this way, the housing 12 does not serve to impede the connection of either jack 40, 68 to the wall jack. This is in contrast to much of the prior art relating to telephone line spring activated recoiling devices, where the male jack is fixed nest to the housing of the recoiling device. This prior art structure may frustrate attachment of either jack since there is not much room to work between the wall and the male jack.

It is to be noted that before letting out the telephone line 62, the second jack 68 cannot be removed from within the area 66. This is because the telephone line 62 is tightly wound on the reel 14 and there is no slack to allow the second jack 68 to be pulled out. In this way, the second jack 68 does not accidentally exit the area 66, which may cause the second jack 68 to be susceptible to contamination, would frustrate compact storage of the device 10, and could possibly damage the second jack 68.

Once outside of the housing 12, the jacks 40, 68, can be connected to the computer and a wall jack, respectively.

After completing use of the device 10, the telephone line 62 is pulled via the first jack 40 to return the second jack 68 to its original position in the area 66. Once the second jack 68 is fixed in place, the reel 14 is turned to wind the telephone line 64 until the first jack 40 is returned to its original position in the peripheral opening 26 of the housing 12. More particularly, the user places e.g. a thumb in the circular depression 56 on the top reel half 44, and the index finger of the same hand on the circular depression 74 on the bottom half 70 of the reel 14, and turns the reel 14 clockwise (looking at the top reel half 44) to take up the telephone line 64. This operation is shown in FIG. 11.

The foregoing is considered illustrative only of the principles of the invention. Further, since numerous modifications and changes will readily occur to those skilled in the art, it is not desired to limit the invention to the exact construction and operation shown and described. For example, as noted above, the present invention could be used to store and let out line for other types of telecommunications applications or circuits, such as optical fiber lines or an electrical extension cord for appliances. Accordingly, all suitable modifications and equivalents may be resorted to that fall within the scope of the invention and the appended claims.

What is claimed is:

1. Telecommunications line storage device, comprising:

a portable housing;

a rotatable reel connected to the housing;

a telecommunications line having a first end with a first connector, and a second end with a second connector, wherein said line is movable between a first retracted position inside the housing, and a second extended position where a majority of the line is outside the housing, and wherein the first connector is positioned inside the reel and the second connector is positioned inside the housing in the first position, and the first and second connectors are positioned outside the reel and the housing, respectively, in the second position.

2. The device as recited in claim 1, wherein the rotatable reel includes means for manual rotation.

3. The device as recited in claim 1, wherein the reel is made of two halves connected together with the line wound therebetween.

4. The device as recited in claim 1, wherein when the device is in the first position, the first connector cannot be pulled out of the reel.

5. A telephone line storage device, comprising:

a portable housing;

a rotatable reel connected to the housing;

a telephone line having a first end with a first telephone jack, and a second end with a second telephone jack, wherein said line is movable between a first retracted position inside the housing, and a second extended position where a majority of the line is outside of the housing, wherein the first telephone jack is positioned inside the reel and the second telephone jack is positioned inside the housing in the first position, and the first and second jacks are positioned outside the reel and the housing, respectively, in the second position.

6. The device as recited in claim 5, wherein the rotatable reel includes means for manual rotation.

7. The device as recited in claim 5, wherein the reel is made of two halves connected together with the line wound therebetween.

8. The device as recited in claim 5, wherein when the device is in the first position, the first jack cannot be pulled out of the reel.

9. A telephone line storage device, comprising:

a portable, hand held housing;

a rotatable reel connected to the housing, wherein the rotatable reel includes means for manual rotation;

a telephone line having a first end with a first telephone jack, and a second end with a second telephone jack, wherein said line is movable between a first retracted position inside the housing, and a second extended position where a majority of the line is outside of the housing, wherein the first telephone jacks is positioned inside the reel and the second telephone jack is positioned inside the housing in the first position, and the first and second jacks are positioned outside the reel and housing, respectively, in the second position, and wherein the rotatable reel includes means for manual rotation.

10. The device as recited in claim 9, wherein the reel is made of two halves connected together with the line wound therebetween.

11. The device as recited in claim 9, wherein when the device is in the first position, the first jack cannot be pulled out of the reel.

12. A method for storing telecommunications line in a housing, comprising the steps of:

(a) forming a housing to receive a rotatable reel, a telecommunications line having a first end with a first connector, and a second end with a second connector, wherein the telecommunications line is wound on the reel, the first connector is positioned inside the reel and the second connector is positioned inside the housing in a first position, and the first and second connectors are positioned outside the reel and housing, respectively, in the second position, and means for manually rotating the reel;

(b) pulling the second connector out of the housing until the line is unwound from the reel; and (c) pulling the first connector out of the reel.

13. The method as recited in claim 12, further comprising the steps of:

(a) pulling the second connector until the first connector is returned to the reel; and (b) manually rotating the reel until the second connector is returned to the housing.

14. A portable cord storage device, comprising:

a portable housing;

a manually rotatable reel connected to the housing;

a computer cord having a first end with a first connector, and a second end with a second connector,
wherein the cord is movable between a first retracted position inside the housing, and a second extended position where a majority of the line is outside the housing, and wherein the first connector is positioned inside the reel and the second connector is positioned inside the housing in the first position, and the first and second connectors are positioned outside the reel and housing respectively, in the second position.

15. A portable telephone line storage device, comprising;

a portable housing;

a rotatable reel connected to the housing;

a telephone line having a first end with a first telephone jack, and a second end with a second telephone jack,
wherein said line is movable between a first retracted position inside the housing, and a second extended position where a majority of the line is outside of the housing, and wherein the first telephone jack is positioned inside the reel and the second jack is positioned inside the housing in the first position, and the first and second jacks are positioned outside the reel and housing, respectively, in the second position.

16. The device as recited in claim 15, wherein the rotatable reel is a manually rotatable reel.

17. A method for storing a cord in a housing, comprising the steps of:

(a) forming a portable housing receiving a manually rotatable reel and a computer cord having a first end with a first connector, and second end with a second connector,
wherein the cord is wound on the reel, the first connector is positioned inside the reel and the second connector is positioned inside the housing in a first position, and the first and second connectors are positioned outside the reel and the housing, respectively, in the second position;

(b) pulling the second connector out of the housing until the cord is unwound from the reel; and (c) pulling the first connector out of the reel.

18. The method as recited in claim 17, further comprising the steps of:

(a) pulling the second connector until the first connector is returned to the reel; and (b) manually rotating the reel until the second connector is returned to the housing.

* * * * *